Figure 1:
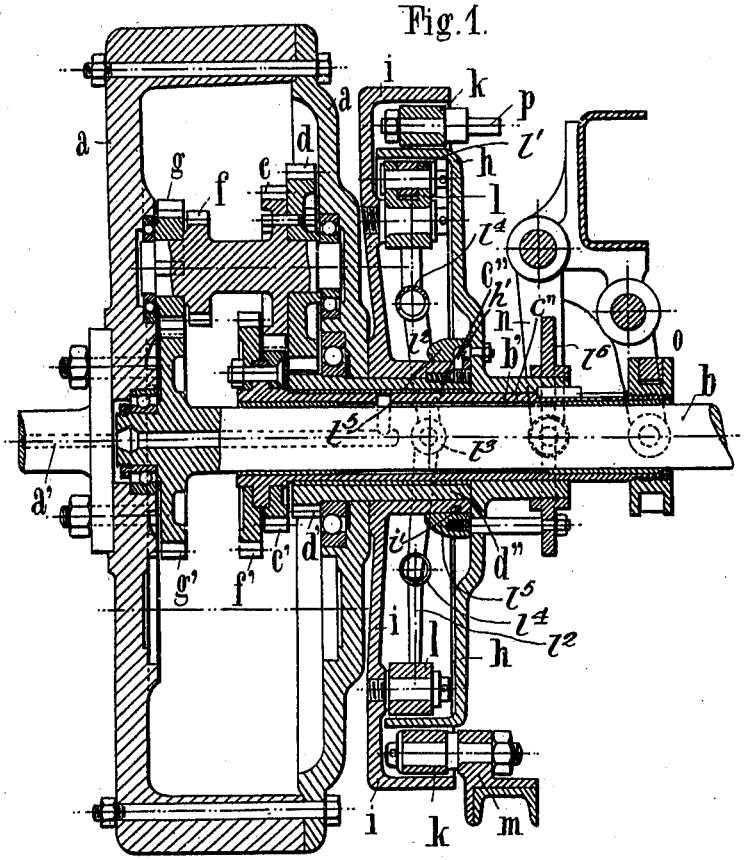

C. E. HENRIOD.
GEARING.
APPLICATION FILED OCT. 22, 1908.

980,254.

Patented Jan. 3, 1911.

3 SHEETS—SHEET 1.

WITNESSES:
James H. Cavanaugh
Josephine Weyl

INVENTOR
Charles Edouard Henriod
BY
ATTORNEYS

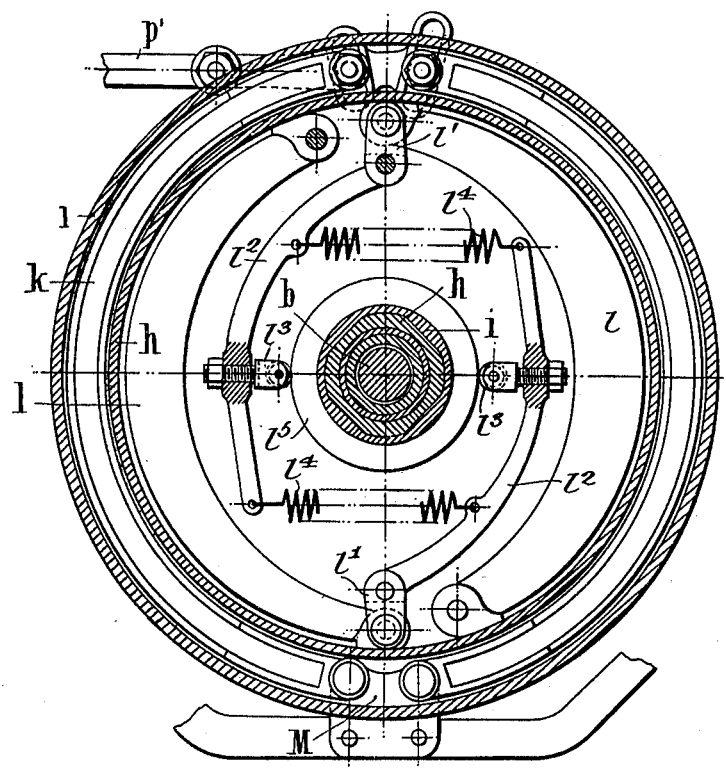

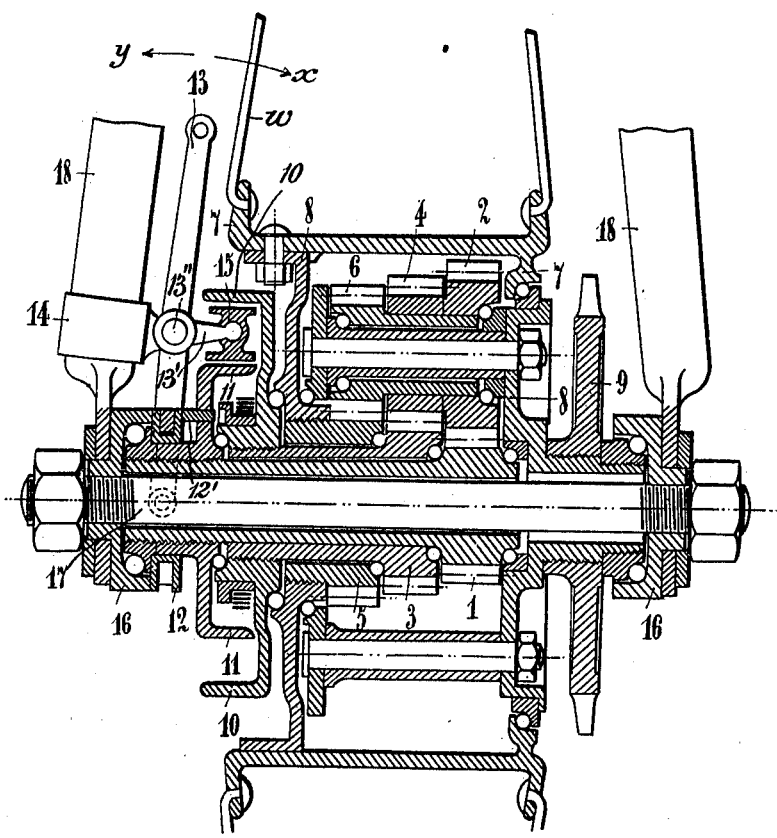

UNITED STATES PATENT OFFICE.

CHARLES EDOUARD HENRIOD, OF NEUILLY-ON-THE-SEINE, FRANCE.

GEARING.

980,254.  Specification of Letters Patent.  Patented Jan. 3, 1911.

Application filed October 22, 1908. Serial No. 459,068.

*To all whom it may concern:*

Be it known that I, CHARLES EDOUARD HENRIOD, a Swiss citizen, residing at Neuilly-on-the-Seine, France, have invented a new and useful Gearing, which improvement is fully set forth in the following specification.

This invention relates to an engine flywheel with change speed gear and clutch, in which three speeds forward and one speed on the reverse are obtained by the manipulation of two brakes, as will be hereinafter described.

This device is chiefly intended for use in connection with motor vehicles.

Figure 1 shows the engine flywheel in longitudinal section, and Fig. 2 in cross-section, while Fig. 3 is a longitudinal section of a cycle hub, showing the application of this invention to a device of that kind.

The apparatus consists of a fly wheel $a$ mounted on the driven shaft $a'$. Loosely borne in the interior of the said fly wheel are systems of planetary gears, each consisting of four wheels $g$, $f$, $c$ and $d$. Projecting centrally into the fly wheel is the driven shaft $b$, which at its inner end carries a wheel $g'$ that is rigidly secured thereto or integral therewith. This wheel constantly meshes with the wheels $g$ of the planetary systems. Loosely and slidably mounted on the driven shaft $b$ is a sleeve $c''$, to which are rigidly secured wheels $c'$, $f'$, in such a position that when the sleeve $c''$ is displaced to the left end, $f'$ is brought into meshing connection with the wheels $f$ of the planetary systems, and when displaced to the right end (into position of Fig. 1) of its longitudinal movement, the wheel $c'$ will be brought into meshing connection with the wheels $c$ of the planetary systems. The wheel $d'$ having a sleeve $d''$ is loosely mounted on the sleeve $c''$ and is adapted to constantly mesh with the wheels $d$ of the planetary systems. The sleeves $c''$ and $d''$ are extended outwardly of the fly wheel and secured on the sleeve $d''$ is a pulley $i$ which is hollow and open at one side. Keyed on the outer extension of the sleeve $c''$ is a second pulley $h$, which is also hollow and which is directed with its open face toward the pulley $i$. This pulley $h$ is smaller in diameter than the pulley $i$ and provided in the annular space between the two pulleys is a brake $k$. This brake is fixed on one hand to the stationary part $m$ on the frame, and on the other hand connected by means of a pin $p$ to a controlling rod $p'$. The brake is so constructed that by the manipulation of the rod $p'$ it can be brought to either act upon the inside of the pulley $i$ or on the outside of the pulley $h$.

Arranged inside of the pulley $i$ is a clutch coupling consisting of clutch arms $l$ connected at opposite ends by means of members $l'$ to curved arms or fingers $l^2$. The latter are pivoted to the pulley $i$ and at intermediate points carry rollers $l^3$ and are connected with one another by spiral springs $l^4$.

Upon the hub of the pulley $h$ is slidably mounted a part $l^6$ connected with a cam portion $l^5$, which upon the inward displacement of the part $l^6$ along the hub of pulley $h$ by means of a lever $n$ is brought into contact with the rollers $l^6$ that, owing to the springs $l^4$, will frictionally engage therewith, coupling the pulleys $i$ and $h$ together.

The hub of the part $i$ is provided with an annular groove $i'$ into which a bent finger $h'$ secured to the part $h$ projects. This groove and finger serve to connect the parts $i$ and $h$, so that the same always remain at a constant distance from one another and yet are permitted relative movement.

The manipulation of the sleeve $c''$ is accomplished by a lever $o$.

The mode of operation of the apparatus is as follows:—Let it be assumed that the brake and clutch are released and that the wheel $f$ is out of engagement with the toothed wheel $f'$, while the wheels $c'$, $d'$ mesh with the wheels $c$ and $d$, respectively. The driving shaft $a'$, rotating with the same speed as the engine will cause the fly wheel $a$ to participate in its rotation. The planetary gears $g$, $f$, $c$ and $d$ are caused to participate in the rotation and turn around their axes, since the wheel $g$ rolls upon the wheel $g'$ which is at rest. When it is desired to start the vehicle, i. e. to bring about the rotation of the shaft $b$ at the lowest speed, the brake $k$ by means of the rod $p'$ is operated, so as to brake the pulley $h$. Owing to this braking action the sleeve $c''$ and the toothed wheel $c'$ will be stopped, but as the said wheel $c'$ is in engagement with the wheels $c$ of the planetary systems, the latter continuing to revolve around the shaft $b$ will now have a different speed than they had before, which by the wheels $g$, $g'$ will be transmitted to the shaft $b$. When it is desired to change to the second speed the brake $k$ is operated, so as to first release it from the pulley $h$ and to have it act upon the pulley $i$. Under these conditions the sleeve $d''$ and the toothed wheel $d'$ will be stopped. The planetary systems will thereby receive a greater speed and transmit the same through the gears $g$, $g'$ to the shaft $b$. In order to change to the third speed, i. e. to the direct drive at which the shaft $b$ rotates with the same speed as the shaft $a$, the clutch $l$ is applied by slightly displacing the part $l^6$ upon the hub of pulley $h$ until the cam portion $l^5$ is brought into contact with the rollers $l^3$ of the arms $l^2$. The result will be that the two pulleys $h$ and $i$ become coupled together, and since each of them is secured to a toothed wheel of different diameter, both of which engage with the planetary systems, the pulleys together with the fly wheel will rotate together, transmitting the same speed of rotation to the gear $g'$ and consequently to the shaft $b$. In order to reverse, the clutch $l$ and the brake $k$ are first released and the sleeve $c''$ is displaced by means of the lever $o$ along the shaft $b$, until the gear $f'$ is brought into meshing connection with the wheels $f$ of the planetary systems. The proportion between the teeth of the wheels $f''$ and $f'$ is such that the planetary systems will be caused to rotate in the opposite direction, which rotation will be transmitted through the wheels $g$, $g'$ to the shaft $b$.

Fig. 3 shows the application of the device to a cycle hub. W is the cycle to be driven at different speeds and mounted with its frame 7 around the spindle 17 borne in the support 16. 8 is the frame of the driving part. Loosely mounted in said frame 8 are planetary systems, each consisting of wheels 2, 4 and 6. Loosely mounted on the spindle 17 is a wheel 1 having an extended sleeve 1'. Loosely mounted on this sleeve 1' is a wheel 3 having a sleeve 3' and loosely mounted on the sleeve 3' is a third wheel 5, the sleeve 5' of which is secured in the frame 8 of the driving part. The wheel 1 is adapted to constantly mesh with the wheels 2 of the planetary system, the wheel 3 with the wheel 4 and the wheel 5 with the wheel 6. 9 is the driving sprocket which is secured to the frame 8 of the driving part. Secured to the outer extension of the sleeve 1' of the wheel 1 is a pulley 11 and secured upon the sleeve 3' of the wheel 3 a pulley 10. 13 is a swinging lever fulcrumed at 13'' and having an elastic arm 13', which carries a brake 15. The lever 13 engages with its lower end a sleeve 12 slidably mounted on the pulley 11. The sleeve 12 is provided with a projection 12' which on the displacement to the right is adapted to pass through an aperture in the pulley 11 and engage into a notch provided in the pulley 10. The operation of this device, being similar to that of the above-described apparatus, is as follows:—When the lever 13 is displaced in the direction of the arrow $x$ the brake block 15 will be caused to act upon and brake the pulley 11. In consequence thereof the wheel 1 will be stopped and the rotation of the sprocket 9 will be transmitted with a certain speed through the gears 5 and 6 to the cycle W. By displacing the lever in the direction of the arrow $y$ the brake 15 will act against the pulley 10 and stop the wheel 3, in consequence of which another speed will be transmitted to the cycle W. By continuing to swing the lever in the direction $y$, the projection 12' of the sleeve 12 will engage the notch of the pulley 10 and thereby lock pulleys 10 and 11. The cycle will consequently be driven with the same speed as the sprocket 9.

What I claim and desire to secure by Letters Patent is:—

1. In a gearing, the combination with a driving part and a driven shaft, of loose planetary systems of wheels of variable diameter, central wheels loosely mounted on the driven shaft and adapted to mesh with some of the planetary wheels, a wheel slidably mounted on the driven shaft and being in regard to one of the planetary wheels so proportioned as to transmit a reverse rotation thereto when brought in engagement therewith, a wheel rigidly connected with the driven part and constantly meshing with one of the wheels of the planetary systems, pulleys secured to the loose central wheels, a brake for braking any one of said pulleys to arrest the said central wheels, and means causing the displacement of the slidable central wheel.

2. In a gearing, the combination with a driving part and a driven shaft, of loose planetary systems of wheels of variable diameter, central wheels loosely mounted on the driven shaft and adapted to mesh with some of the planetary wheels, a wheel rigidly connected with the driven part and adapted to constantly mesh with one of the wheels of the planetary systems, pulleys secured to the loose central wheels, a brake for braking any one of said pulleys to arrest the said planetary wheels, and a clutch to lock the pulleys to one another, substantially as and for the purpose specified.

3. In a gearing, the combination with a driving shaft and a driven shaft, of a fly wheel secured thereto, loose systems of planetary wheels of variable diameter to allow three changes of speed and a reverse drive, central wheels having sleeves and loosely mounted on the driven shaft, one of said wheels being adapted to constantly mesh with one of the planetary wheels, a wheel slidably mounted on the driven shaft, said wheel being in regard to one of the planetary wheels so proportioned as to allow a reverse drive when in meshing connection therewith, a wheel rigidly connected with the driven shaft and constantly meshing with the planetary wheels, pulleys secured to the sleeves of the loose wheels, a brake to arrest any one of said pulleys, and a clutch for locking the said pulleys to one another, substantially as and for the purpose specified.

In testimony whereof I have signed this specification in the presence of two subscribing witnesses.

CHARLES EDOUARD HENRIOD.

Witnesses:
   EMILE LEDRET,
   DEAN B. MASON.